June 8, 1965 W. JACKSON 3,188,567

REMOTE STATION SIGNAL SYSTEM

Filed May 24, 1963

4 Sheets-Sheet 1

INVENTOR
*Wilbur Jackson*

BY [signature]

ATTORNEY

June 8, 1965 W. JACKSON 3,188,567

REMOTE STATION SIGNAL SYSTEM

Filed May 24, 1963

4 Sheets-Sheet 2

INVENTOR
Wilbur Jackson

BY James H. Littlepage

ATTORNEY

June 8, 1965 W. JACKSON 3,188,567

REMOTE STATION SIGNAL SYSTEM

Filed May 24, 1963

4 Sheets-Sheet 3

INVENTOR

*Wilbur Jackson*

BY James H. Littlepage

ATTORNEY

June 8, 1965 W. JACKSON 3,188,567

REMOTE STATION SIGNAL SYSTEM

Filed May 24, 1963 4 Sheets-Sheet 4

INVENTOR
*Wilbur Jackson*

BY James H. Littlepage

ATTORNEY

United States Patent Office 3,188,567

Patented June 8, 1965

3,188,567
REMOTE STATION SIGNAL SYSTEM

Wilbur Jackson, P.O. Box 286, Chatsworth, Ga.

Filed May 24, 1963, Ser. No. 282,899
6 Claims. (Cl. 325—163)

This invention relates to an automatic alarm station for remote installation and, more particularly, to a plural tone signal generator and control system therefor which will produce a predetermined sequence of signals upon actuation of a sensing device. This application is a continuation-in-part of my copending application Serial No. 142,119, filed October 2, 1961, entitled Automatic Radio Warning System now Patent No. 3,102,235.

One of the objects of the invention is to provide an automatic alarm system which performs a predetermined sequence of operations upon actuation, however momentary, of a sensing device, and which can be set to perform the sequence either immediately upon or at a predetermined interval after actuation of the sensing device. Thus, for example, warm-up time may be gained for a radio transmitter linking the remote station to a central station; stabilization of tone generators may occur; or, when two or more remote stations are used for sensing a plurality of inter-related functions or events which are liable to occur at or near the same time, the time delays of the various remote stations may be set for different durations so as to minimize interference between them.

Another object is the provision of an electrical alarm system which draws no current except when a signal is to be transmitted and, particularly, which disables itself after a predetermined interval of signal transmission, thereby making it particularly desirable for use in connection with battery power supplies. Thus, even if the sensor which triggers the system into operation continues to be actuated, the remote station will shut itself off after its signal transmission so as to require affirmative reset, thereby clearing the air for other signal transmissions which may be equally vital.

These and other objects will be apparent from the following circuit diagrams, all of them of the same system, wherein.

Figure 1:
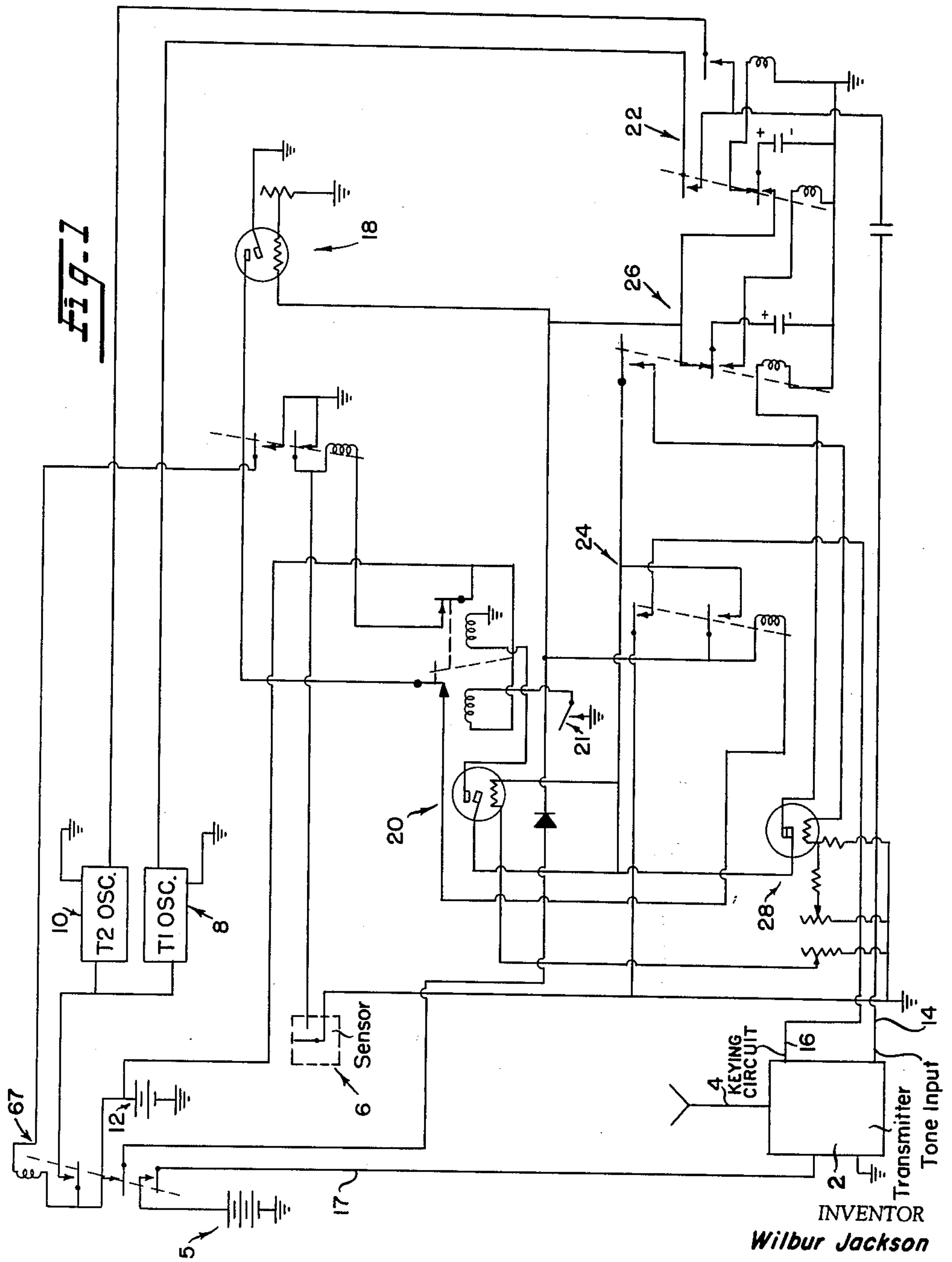
FIG. 1 represents the system in reset condition of repose.

Referring first to FIG. 1 of the drawings, in which like reference numerals denote similar elements, the major groups of components are designated with arrow lead lines. Assuming the remote station, to which the circuit diagrams are devoted, is to communicate with a central station, not shown, by means of a radio link, the remote station includes a radio transmitter 2 having the usual antenna 4 and a power supply 5 from which the transmitter is normally disconnected. A sensor 6 is associated with the device to be monitored, it being understood by those skilled in the art that the device may constitute any one of a number of standard detecting or sensing elements, for example, a pressure sensing device in a conduit. The circuit also includes two oscillators 8 and 10 having a power supply 12 from which they are normally disconnected. Oscillators 8 and 10 alternately feed two respectively different tones T1 and T2 to the tone input 14 of transmitter 2 so as to modulate the latter, assuming the transmitter keying the circuit 16 and its power supply circuit 17 are closed. Momentary closing of the contacts of sensor 6 actuates the time delay starting circuit 18 which, as will be detailed hereinafter, initiates a signal cycle after a predetermined time allowed for warm-up of the transmitter 2, and the signal cycle, after a predetermined time of operation, is cut off by a time delay disabling circuit 20 so that it may not again be actuated until the circuit is restored by closing a reset switch 21 which, in a typical installation, is remotely controlled from the central station. After the transmitter has warmed up and been put on the air, oscillators 8 and 10 are alternately connected to the tone input circuit 14 of the transmitter by means of a tone alternating circuit 22. Various functions of the circuit are under the control of the master relay 24, and the duration of the tones and the frequency with which they are shifted back and forth are under the control of a tone cycle control relay 26 and time delay cycle controller 28. For purposes of simplifying the explanation, the major components are diagrammed in static condition in FIG. 1, wherein the contacts of sensor 6 are open, and the circuits leading from power supplies 5 and 12 are open, thereby avoiding drainage of current therefrom.

Figure 2:
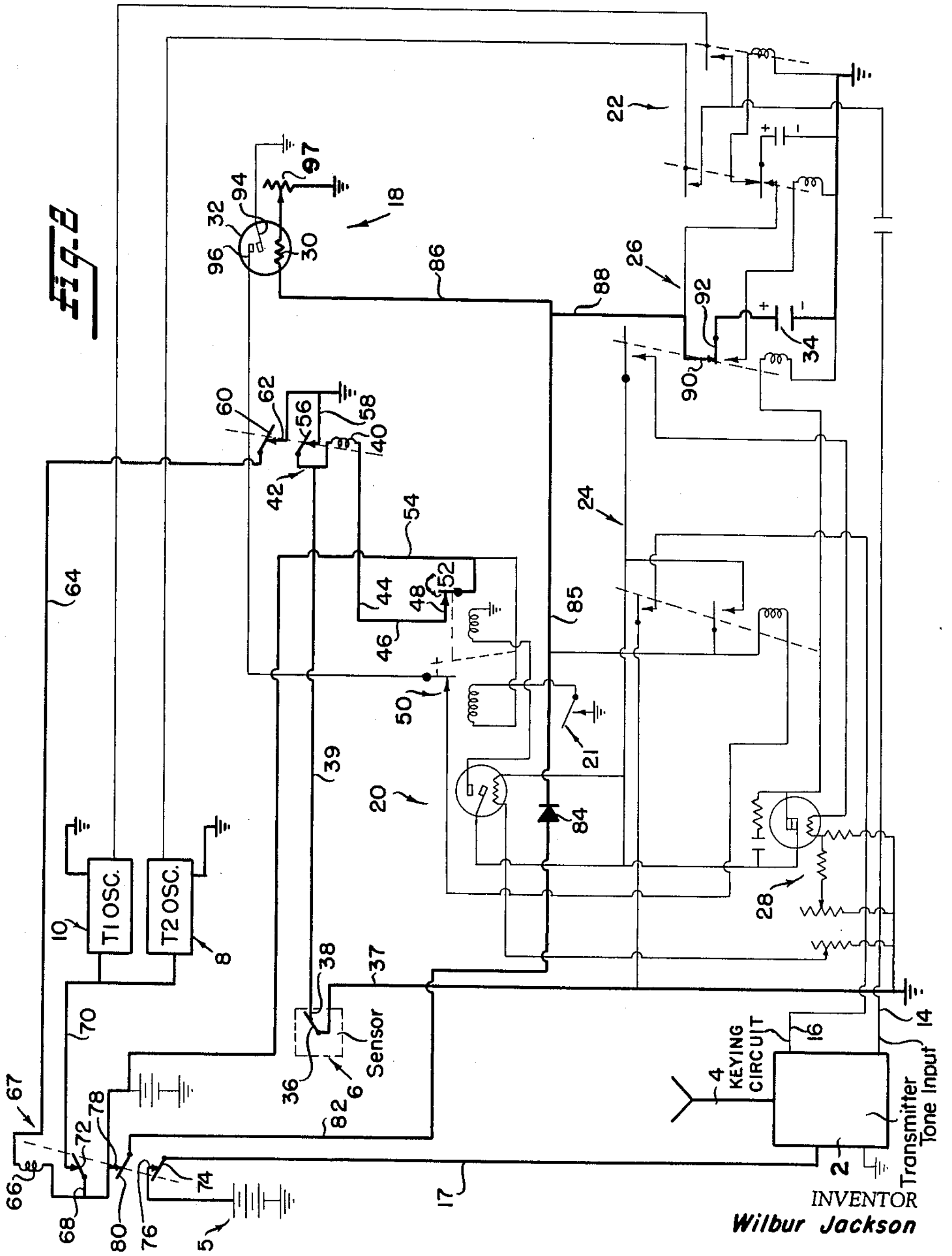
FIG. 2 shows, in heavy lines, the circuits active during the time delay before signal transmission.

FIG. 2 illustrates the warm-up phase of the circuit which initiates upon closure, however momentary, of the contacts of sensor 6. During the warm-up phase, the power supply circuit 17 for transmitter 2 is closed, as also is the power supply connected to oscillators 8 and 10, and the heater 30 in a thermal time delay relay 32 is also energized, and a capacitor 34 charges, all by the circuits shown in heavy lines to denote their activity during the warm-up phase.

Referring particularly to the heavy line circuits of FIG. 2, when arm 36 is actuated, as by change in the condition being sensed, a circuit from ground lead 37 may be traced through arm 36, contact 38 and lead 39 to one side of coil 40 of a relay 42. The other side of coil 40 is connected to the plus side of power supply 12 via a circuit traced through lead 44 and contact 48 of a polarized relay 50, one arm 52 of which is normally closed against contact 48, thereby completing the circuit via lead 54 to the plus side of battery 12. Winding 40 of relay 42 is thus energized, thereby pulling in an arm 56 against ground contact 58 to establish a holding circuit so that relay 42 remains energized even though the arm 36 of sensor 6 may have resumed its initially opened position. Upon energization of winding 40 of relay 42, another arm 60 pulls in against ground contact 62, thereby establishing a power circuit 64 to one side of the winding 66 of a power control relay 67. The other side of winding 66 is connected by lead 68 to the plus side of power supply 12 so that, upon energization of winding 66, relay 67 pulls up. A power supply circuit 70 is thus established to oscillators 8 and 10 from the plus side of power supply 12 via the then closed contact 72 of relay 67 and lead 68. The power supply circuit 17 to transmitter 2 is also closed when relay 67 pulls up so as to hold arm 74 against contact 76. Still another power supply circuit is established when relay 67 pulls up, this one running from the plus side of battery 12 through contact 78, the then closed arm 80 and lead 82 to diode 84. Lead 85 on the other side of diode 84 connects to one branch 86 which energizes the heater 30 of time delay relay 32 and through another branch 88 to the contact 90 on tone cycle control relay 26. Arm 92 then being closed against contact 90, capacitor 34 is charged by the 12-volt circuit originating at power supply 12. While transmitter 2 heats in readiness to go on the air, heater 30 of time delay relay 32 generates sufficient heat to warp its arm 94 against contact 96 as indicated by the curved arrow, thereby initiating the next phase of the operating cycle. The rate of heat generation of heater 30 may be adjusted by potentiometer 94 and, hence, the time delay between actuation of sensor 6 and the "on the air" and message transmission of the system may be predetermined.

Figure 3:
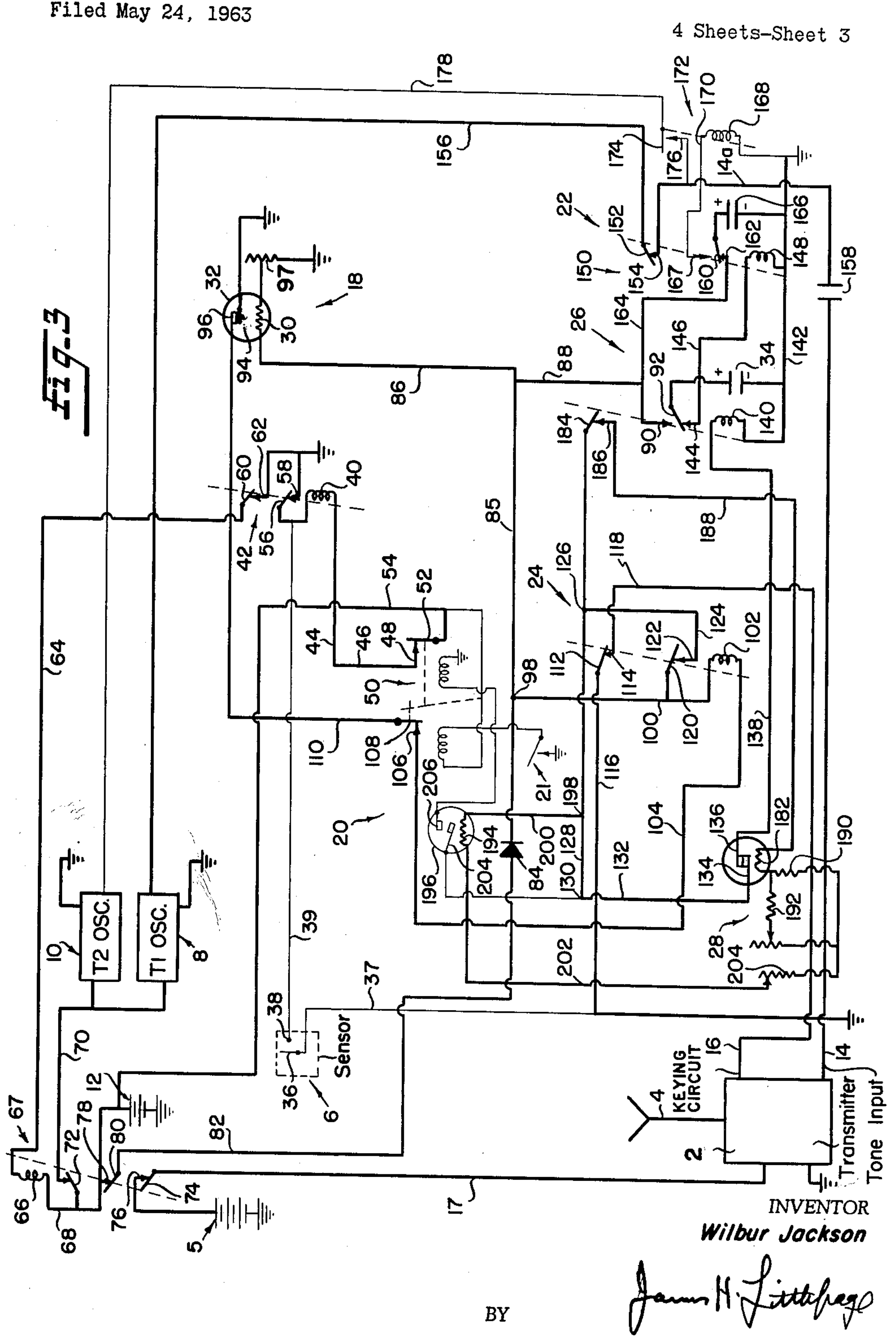
FIG. 3 shows, in heavy lines, the circuits active during the full operational phase of the sequence; and, FIG. 4 shows, by heavy dash lines, the de-actuating circuit which disables the system after a predetermined interval of message transmission.

FIG. 3 illustrates the full operational phase of the system. When arm 94 warps against contact 96 of time delay relay 32, a power circuit is closed which may be traced from power supply 12 and lead 82–85 and from connection 98 via lead 100 through the winding 102 of master relay 24, and thence via lead 104 to contact 106 of polarized relay 50, the latter being normally closed to the left as seen in the diagrams so that the power circuit continues through arm 108 and lead 110 through the then closed contacts of time delay relay 32 to ground. Master relay 24 pulls in, thereby closing arm 112 against contact 114 to complete a keying circuit from ground lead 37 via branch 116 and lead 188 to the key circuit 16 of transmitter 2, thereby putting the transmitter on the air. When master relay 24 pulls in, a power circuit is also established from connection 98 via lead 100 and through arm 120, contact 122 and lead 124 to connection 126 on a bus 128, the latter having a connection 130 at one end with lead 132 which runs to arm 134 on time delay relay 28, the arm being normally closed against contact 136 so that the power circuit continues through lead 138 to one end of winding 140 on the tone cycle control relay 26, and thence to ground lead 142 so that relay 26 pulls in. As previously noted in connection with FIG. 2, the capacitor 34 was charged through arm 92 which was previously closed against contact 90. However, when winding 140 is energized, arm 92 pulls in against contact 144, thereby discharging capacitor 34 via lead 146 through winding 148 of a relay 150. Energization of winding 148 results in closure of arm 152 against contact 154, thereby establishing a circuit from the output of oscillator 8 via lead 156 and tone input circuit 14*a*, capacitor 158 and lead 14 to the tone input connection of transmitter 2, thus modulating the transmitter with one tone T1 of predetermined frequency. Relay 150 remains closed until capacitor 34 has discharged through winding 148, whereupon relay 150 lets go so as to break the output circuit 156 from oscillator 8. However, meanwhile, a capacitor 166 has charged through arm 160 when the latter closed against contact 162, the latter being connected by lead 164 and branch 88 to the twelve-volt power supply circuit 85, etc. When relay 150 lets go, arm 160 engages contact 167 so as to discharge capacitor 166 through winding 168, via circuit 170, of relay 172, thereby pulling its arm 174 against contact 176, and connecting the output circuit 178 of oscillator 10 to tone input circuit 14*a* so as to modulate transmitter 2 with a second tone T2, and the second tone endures until capacitor 166 discharges enough so that relay 172 lets go. Assuming, for example, the tone signals are a "B*e*" and a "B*o*," the lengths thereof may be predetermined by the sizes of capacitors 34 and 166, and the hold-in current requirements of relay windings 148 and 168.

If winding 140 of relay 26 remained energized throughout the full operational phase of the system, only one "B*e*B*o*" would be transmitted. However, it should be noted that heater 182 of time delay relay 28, which is in the energizing circuit for winding 140, was energized when relay 26 pulled in, thereby closing arm 184 against contact 186 to establish a power circuit from the right hand end of bus 128 to heater 182 and thence via resistor 190 and potentiometer 192 in shunt therewith to ground. As soon as arm 134 warps away from contact 136, winding 140 is de-energized and relay 26 lets go, thereby re-establishing the charge circuit for capacitor 34 via arm 92 and contact 90. Simultaneously, the power circuit for heater 182 is broken so as to permit the latter to cool and arm 134 warps back against contact 136 so as to initiate a second "B*e*B*o*" sequence. One or more of the "B*e*–B*o*" sequences can be predetermined by selection of time delay relay 28 for its desired characteristics and adjustment of potentiometer 192.

During the "B*e*B*o*" cycling of the full operational phase circuit as denoted by the heavy lines in FIG. 3, a heater 194 of a normally open time delay relay 196 is energized by a circuit running from connection 198 on bus 128 via lead 200, heater 194 and lead 202 through potentiometer 204 to ground. As soon as arm 204 warps against contact 206, the full operational phase of the system is terminated virtually instantaneously.

Figure 4:
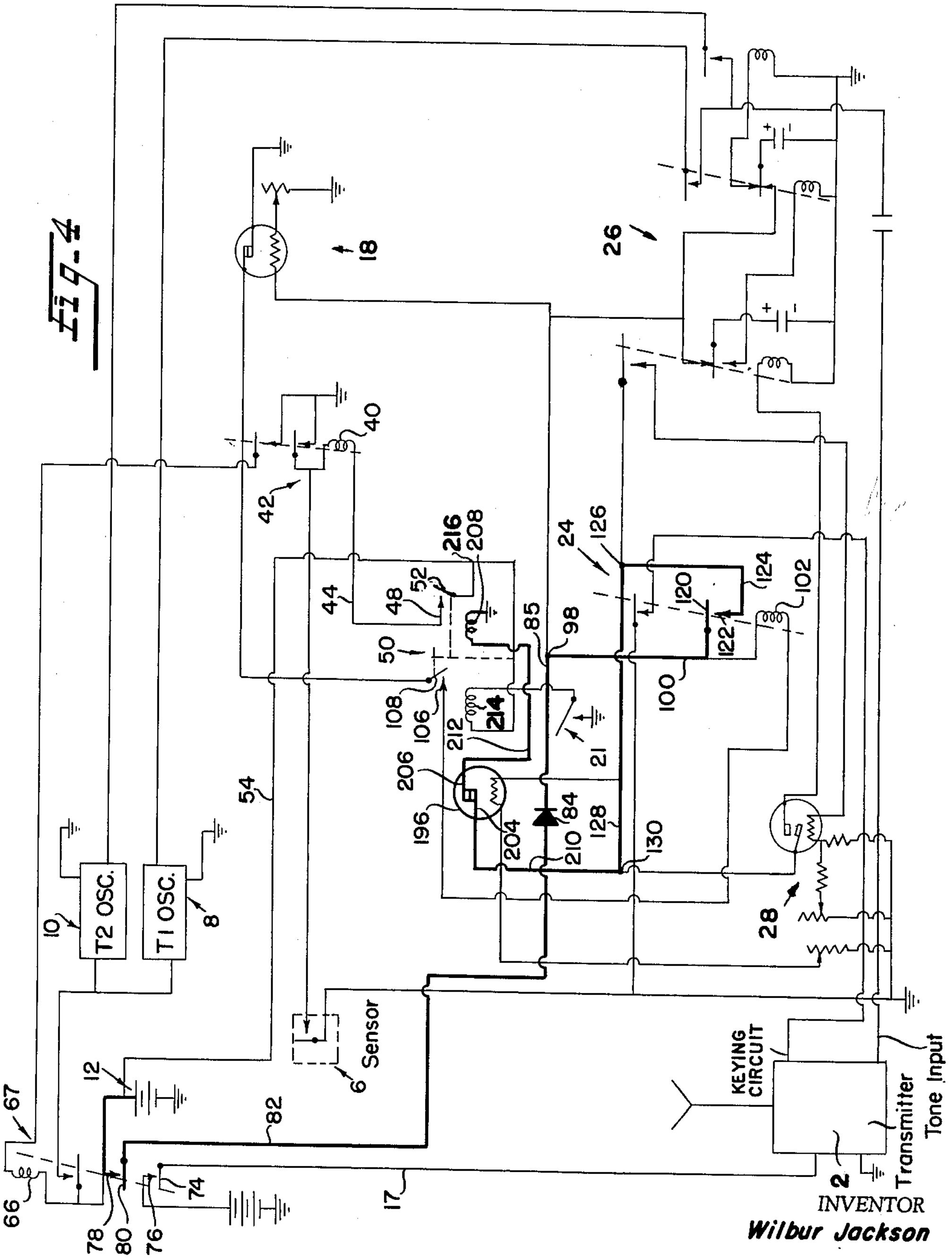

FIG. 4 illustrates the termination of the full operational cycle, the circuits accented by dash lines being the ones which were active as of the instant of deactivation of the system. The power circuit through winding 208 polar relay to ground was established from power supply 12 through contact 78 and the then closed arm 80 of relay 67, lead 82, diode 84 and lead 85, connection 98, lead 100 and arm 120 of master relay 24 which was then closed against contact 122 and thence via lead 124 and connection 126 on bus 128 to connection 130, and thence via lead 210 through arm 204 and contact 206 of thermal time delay relay 196 and on through lead 212 to winding 208. Energization of winding 208 pulls arm 108 away from contact 106 and also pulls arm 52 away from contact 48. Power supply 12 is thus disconnected from winding 40 of relay 42 and the latter lets go, thereby killing the power to winding 66 of power control relay 67. Power supply circuit 17 to transmitter 2 is thus disconnected by the opening of arm 74 away from contact 76. Likewise, the power supply to winding 102 of master relay 24 is broken by the opening of arm 80 of power control relay 67 away from contact 78. The circuit remains inoperative until reset switch 21 is closed, thereby energizing winding 214 of polar relay 50 by means of a circuit running from power supply 12 through lead 54 to connection 216 and thence through winding 214 and reset switch 21 to ground. Energization of winding 214 pulls polar relay 50 back to its FIG. 1 position so as to ready the circuit for the next signal from sensor 6.

The circuit described in the foregoing specification is particularly advantageous for remote installations utilizing battery power supplies because no drain on the batteries occurs until sensor 6 is excited, and then the circuits are activated only for the time required for warm-up, if necessary, and for the duration of the code transmission. The on-the-air time for the transmitter is limited to the duration of the code transmission and thus interference with other message transmissions on the same or adjacent channel is reduced to a minimum. The system may be adapted for alternating current power supplies and, for transmitters and oscillators which need no warm-up time, the delay elements of starting circuit 18 may be eliminated, and other types of time delay relays may be substituted, it being understood that the invention is not limited to the details of the system disclosed, but is intended to cover all substitutions and modifications and equivalents within the scope of the following claims.

I claim:

1. In a condition responsive signalling system, a pair of discrete tone generators; a tone output circuit; slave relay means having switch means actuatable for selectively connecting said generators to said tone output circuit and having a control element energizable for sequentially actuating said switch means; a main power control relay having power input and power feed connections with normally open switch means therebetween; a condition sensing device; means responsive to the sensing of a condition by said device for closing said normally open switch means of said main power control relay; a first circuit running from one of said feed connections for energizing the control element of the slave relay means; a master relay having a normally open switch in said first circuit between the power feed connection thereof and the control element of the slave relay means and having a control element energizable for closing said switch means; a second circuit running from one of said feed connections for energizing the control element of the master relay;

a polarized relay having a bi-stable switch in said second circuit between the feed connection thereof and the control element of the master relay and having first and second control elements selectively energizable for shifting said bi-stable switch respectively between open and closed conditions; a third circuit for energizing the first control element of the polarized relay and having a power input connection with the first circuit between the switch of the master relay and the control element of the slave relay means; a time delay relay including a normally open switch in said third circuit between the power input connection thereof and the first control element of the polarized relay and including time-lag control means connected to the first circuit between the switch of the master relay and the control element of the slave relay means for closing the normally open switch of the polarized relay at the end of a predetermined interval running concurrently with energization of the control element of the slave relay means whereby to shift said bi-stable element to circuit opening condition; and a fourth circuit for energizing the second control element of the polarized relay, said fourth circuit running from a power feed connection independent of the power feed connection of the main power supply relay and including a normally open switch for resetting said bi-stable switch to circuit-closing condition.

2. The combination claimed in claim 1, and a normally closed cyclically opening relay in the first circuit between the normally open switch means of the master relay and the control element of the slave relay means.

3. The combination claimed in claim 1, said condition sensing device including normally open contacts which close in response to the sensed condition; said polarized relay including a second bi-stable switch shifting with the first-mentioned bi-stable switch between open and closed positions upon energization of said first and second control elements; said main power control relay including a control winding; an energization circuit for said control winding; a holding relay having a winding and a normally open switch in said energizing circuit; and a hold circuit for said holding relay including, in series, the contacts of said sensing device and the second bi-stable switch of the polarized relay.

4. The combination claimed in claim 3, and a time-delay relay having a normally open switch in said second circuit and including means energized from one of the feed connections of the main power control relay for closing the last-mentioned switch at the end of a predetermined interval following closure of the switch means in the main power control relay.

5. In the combination claimed in claim 4, a communications transmitter having a signal input connected to said tone output circuit and a main power input connected to one of the feed connections of said main power control relay.

6. The combination claimed in claim 5, said radio transmitter having a keying circuit; said master relay having another normally open switch in said keying circuit.

No reference cited.

NEIL C. READ, *Primary Examiner.*